(12) United States Patent
Chen et al.

(10) Patent No.: US 12,573,377 B2
(45) Date of Patent: Mar. 10, 2026

(54) STABLE OUTPUT STREAMING SPEECH TRANSLATION SYSTEM

(71) Applicant: Microsoft Technology Licensing, LLC, Redmond, WA (US)

(72) Inventors: Junkun Chen, Issaquah, WA (US); Jinyu Li, Bellevue, WA (US); Peidong Wang, Bellevue, WA (US); Jian Xue, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 18/200,889

(22) Filed: May 23, 2023

(65) Prior Publication Data

US 2024/0395240 A1 Nov. 28, 2024

(51) Int. Cl.
| *G10L 15/08* | (2006.01) |
| *G10L 15/00* | (2013.01) |
| *G10L 15/04* | (2013.01) |

(52) U.S. Cl.
CPC ............ *G10L 15/005* (2013.01); *G10L 15/04* (2013.01); *G10L 15/08* (2013.01); *G10L 2015/081* (2013.01)

(58) Field of Classification Search
CPC ....... G10L 15/08; G10L 15/16; G10L 15/005; G10L 15/02; G10L 15/04; G06N 3/02;

(Continued)

(56) References Cited

U.S. PATENT DOCUMENTS

| 9,830,318 | B2 | 11/2017 | Waibel |
| 2007/0043560 | A1* | 2/2007 | Lee ......................... G10L 19/12 |
| | | | 704/219 |

(Continued)

FOREIGN PATENT DOCUMENTS

| CN | 113851111 A | 12/2021 |
| CN | 113889080 A | 1/2022 |

(Continued)

OTHER PUBLICATIONS

Zhang et al., Chunk-Level reordering of source language sentences with automatically learned rules for statistical machine translation., Apr. 2007, Proceedings of SSST, pp. 1-8 (Year: 2007).*

(Continued)

*Primary Examiner* — Jakieda R Jackson
(74) *Attorney, Agent, or Firm* — Schwegman Lundberg & Woessner, P.A.

(57) ABSTRACT

A computer implemented method includes receiving speech data representative of speech in a first language The speech data is divided into chunks of speech data, each chunk comprising multiple temporally consecutive frames of acoustic information. Each temporally consecutive chunk of data is processed using beam search on each frame to identify candidate language tokens representing a second language different from the first language. A best candidate language token(s) is selected for each chunk as processed. The selected best candidate language token or tokens for each chunk of data is committed as a prefix for a next temporally consecutive chunk of data.

20 Claims, 13 Drawing Sheets

(58) Field of Classification Search

CPC ....... G06N 3/044; G06F 40/40; G06F 40/289; G06F 40/58; G06F 16/35; G06F 16/3344

See application file for complete search history.

(56) References Cited

U.S. PATENT DOCUMENTS

| | | | |
|---|---|---|---|
| 2008/0154577 A1 | 6/2008 | Kim et al. | |
| 2015/0134320 A1* | 5/2015 | Rangarajan Sridhar | G10L 15/005 |
| | | | 704/2 |
| 2017/0331782 A1* | 11/2017 | Lai | G06F 40/40 |
| 2017/0372693 A1 | 12/2017 | Rangarajan Sridhar et al. | |
| 2020/0334526 A1 | 10/2020 | Li et al. | |
| 2021/0390127 A1* | 12/2021 | Fox | G06F 16/335 |
| 2022/0005465 A1 | 1/2022 | Prabhavalkar et al. | |
| 2022/0028395 A1* | 1/2022 | Li | G10L 25/78 |
| 2022/0310081 A1* | 9/2022 | Gaur | G10L 15/22 |
| 2022/0351718 A1 | 11/2022 | Wu et al. | |
| 2023/0043217 A1* | 2/2023 | Margolin | G06F 16/2365 |
| 2023/0103728 A1* | 4/2023 | Liu | G06F 40/30 |
| | | | 704/9 |
| 2023/0367967 A1* | 11/2023 | Filipchuk | G06F 16/3344 |
| 2024/0248900 A1* | 7/2024 | Sharma | G06F 16/24578 |

FOREIGN PATENT DOCUMENTS

| | | |
|---|---|---|
| JP | 2005025474 A | 1/2005 |
| WO | 2022181040 A1 | 9/2022 |

OTHER PUBLICATIONS

Liu, et al., Low-latency sequence-to-sequence speech recognition and translation by partial hypothesis selection, Oct. 2020, Dept. of data science and knowledge engineering, all pages (Year: 2020).*

Likitha et al., Speech based human emotion recognition using MFCC, 2017, IEEE, p. 2257-2260 (Year: 2017).*

Arivazhagan, et al., "Monotonic Infinite Lookback Attention for Simultaneous Machine Translation", In Proceedings of the 57th Annual Meeting of the Association for Computational Linguistics (ACL), Jul. 28, 2019, pp. 1313-1323.

Arivazhagan, et al., "Re-Translation versus Streaming for Simultaneous Translation", In Proceedings of the 17th International Conference on Spoken Language Translation, Jul. 9, 2020, pp. 220-227.

Bahdanau, et al., "Neural Machine Translation by Jointly Learning to Align and Translate", In repository of arxiv code:1409.0473v7 [cs.CL], May 19, 2016, 15 Pages.

Berard, et al., "Listen and Translate: A Proof of Concept for End-to-End Speech-to-Text Translation", In Repository of arXiv:1612.01744v1, Dec. 6, 2016, 5 Pages.

Chen, et al., "Direct Simultaneous Speech-to-Text Translation Assisted by Synchronized Streaming ASR", In Proceedings of Findings of the Association for Computational Linguistics: ACL-IJCNLP, Aug. 1, 2021, pp. 4618-4624.

Kim, et al., "Improved Neural Language Model Fusion for Streaming Recurrent Neural Network Transducer", In Repository of arXiv:2010.13878v1, Oct. 26, 2020, 5 Pages.

Ma, et al., "STACL: Simultaneous Translation with Implicit Anticipation and Controllable Latency using Prefix-to-Prefix Framework", In Repository of arXiv:1810.08398v5, Jun. 24, 2019, 12 Pages.

Miao, et al., "A Generative Framework for Simultaneous Machine Translation", In Proceedings of the Conference on Empirical Methods in Natural Language Processing, Nov. 2021, pp. 6697-6706.

Raffel, et al., "Online and linear-time attention by enforcing monotonic alignments", In Proceedings of International Conference on Machine Learning, Aug. 6, 2017, 19 Pages.

Xue, et al., "Improving Latency-Controlled BLSTM Acoustic Models for Online Speech Recognition", In Proceedings of IEEE International Conference on Acoustics, Speech and Signal Processing, Mar. 5, 2017, pp. 5340-5344.

Xue, et al., "Large-Scale Streaming End-to-End Speech Translation with Neural Transducers", In Repository of arXiv:2204.05352v2, Jul. 1, 2022, 5 Pages.

Yeh, et al., "Streaming Attention-Based Models with Augmented Memory for End-to-End Speech Recognition", In Repository of arXiv:2011.07120v1, Nov. 3, 2020, 7 Pages.

Zhang, et al., "Highway long short-term memory rnns for distant speech recognition", In Proceedings of the IEEE International Conference on Acoustics, Speech and Signal Processing, Jan. 11, 2016, 5 Pages.

Chen, et al., "Improving Stability in Simultaneous Speech Translation: A Revision-Controllable Decoding Approach," IEEE Automatic Speech Recognition and Understanding Workshop (ASRU), 2023, 07 Pages.

International Search Report and Written Opinion received for PCT Application No. PCT/US2024/030143, Jul. 16, 2024, 11 pages.

Zeng, et al., "RealTranS: End-to-End Simultaneous Speech Translation with Convolutional Weighted-Shrinking Transformer," In Repository of arXiv:2106.04833, Jun. 9, 2021, 14 Pages.

International Preliminary Report on Patentability (Chapter I) received for PCT Application No. PCT/US2024/030143, mailed on Dec. 4, 2025, 08 pages.

* cited by examiner

STABLE OUTPUT STREAMING SPEECH TRANSLATION SYSTEM

BACKGROUND

Streaming end to end translation systems are used to translate speech in real time into text in a target language different from the speech. Such systems receive digital representations of the speech and generate speech tokens. A beam search method is used to search for characters or words corresponding to the tokens.

Intermediate translation results of the beam search may be displayed as characters or words are discovered in an attempt to provide a translation quickly. The intermediate translation results are usually continuously revised as the streaming speech proceeds.

The revisions can dramatically affect an audience's experience of understanding the speech content. The revisions also make it impossible to incrementally synthesize or generate speech output in the target language in a timely manner.

SUMMARY

A computer implemented method includes receiving speech data representative of speech in a first language. The speech data is divided into chunks of speech data, each chunk comprising multiple temporally consecutive frames of acoustic information. Each temporally consecutive chunk of data is processed using beam search on each frame to identify candidate language tokens representing a second language different from the first language. A best candidate language token(s) is selected for each chunk as processed. The selected best candidate language token or tokens for each chunk of data is committed as a prefix for a next temporally consecutive chunk of data.

DETAILED DESCRIPTION

Figure 1:
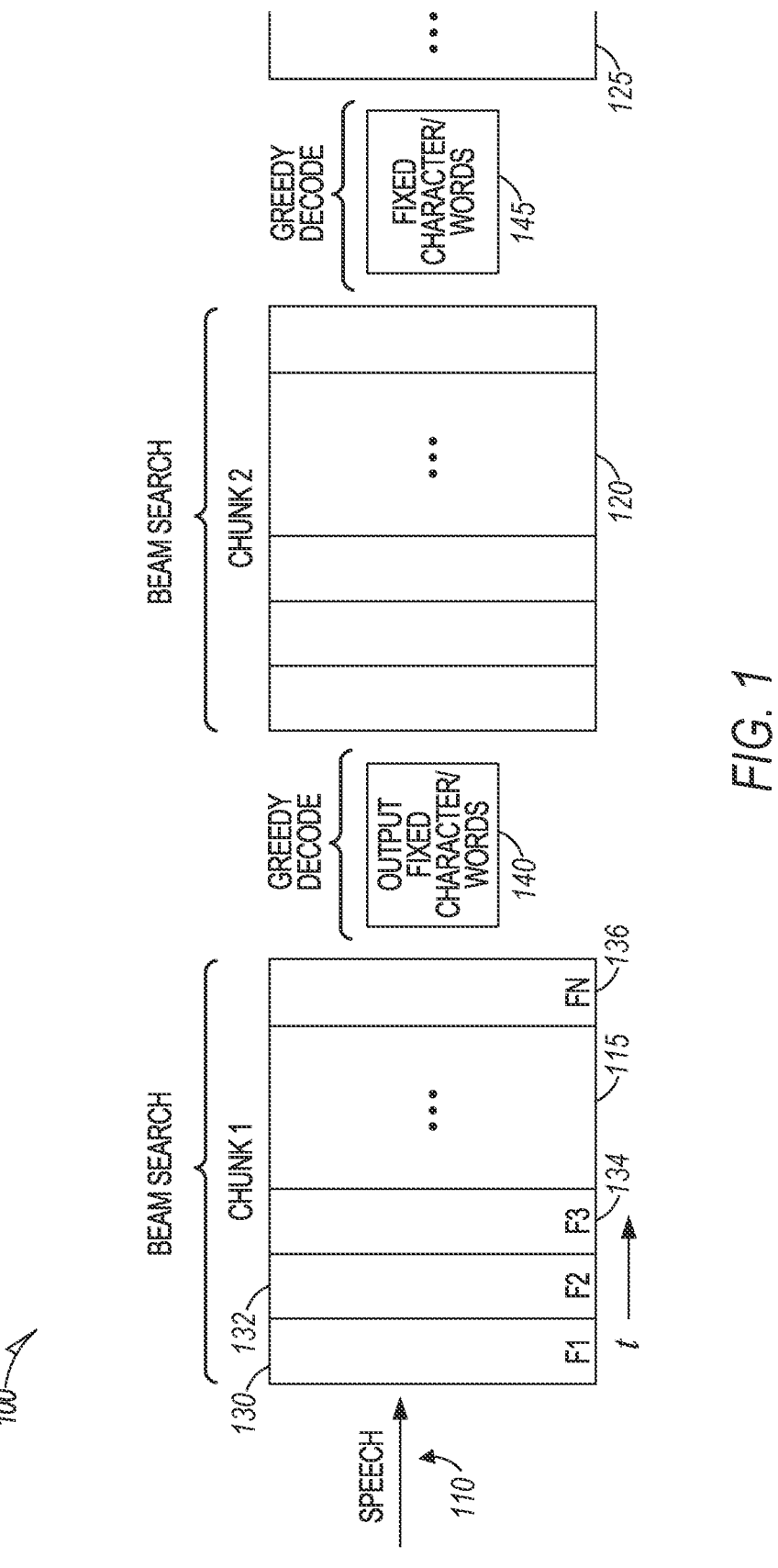
FIG. 1 is a block flow diagram for providing low latency translation of speech in a source language to speech in a target language that is different than the source language according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Streaming end to end translation systems are used to translate speech in real time into text in a target language different from the speech. Such systems receive digital representations of the speech and generate speech tokens in the target language by searching through a library of tokens that match the acoustic information in the frames. Several different decoding methods may be used to translate the speech into text tokens, such as greedy search and beam search.

A greedy search generally attempts to find a local solution at each level and fixes the result at each level. While a greedy search can produce a fixed result in a reasonable amount of time, the result can lack accuracy.

A beam search method searches multiple paths through a tree or graph representation of the tokens, ranking each path. While beam search is well known and provides good quality, intermediate results may be frequently revised as a result of reranking. Such reranking results in changes in the tokens as a transcript of the speech is produced. A trivial solution to reduce the number of changes is to emit only the longest common prefix of all the candidate tokens. However, the candidate sequences of tokens can have large variations, which results in very short common prefix. This eventually leads to poor latency.

The revisions can dramatically affect an audience's experience of understanding the speech content. The revisions also make it impossible to incrementally synthesize or generate speech output in the target language in a timely manner.

For simultaneous translation, a greedy search is a commonly used approach to keep translated results unrevised. While greedy decoding does not result in revisions, results may be poor in quality An improved speech translation system translates speech in a source language into a target language without revising translation results. In one example, speech in the source language is received as frames of acoustic data. Each frame corresponds to a fixed length of time, such as 40 ms. Multiple successive frames are combined into a chunk.

A beam search for target language tokens, such as characters or words, is performed on each frame in the chunk. Intermediate results of tokens between frames are used as a prefix for processing further frames. The intermediate results may change as further frames are processed.

A fixed result of one or more tokens is generated for the chunk and provided as an output of the system. The fixed result may be thought of as a greedy search result between chunks. While results within a chunk may change progressing from frame to frame using the beam search, the result following the last frame of the chunk is fixed. The output is used as a fixed prefix for processing successive chunks, with each successive chunk also processed using the bean search algorithm.

In one example, the number of frames in a chunk may be dynamically varied to account for languages that may order words differently than in the spoken language. By varying the chunk size to be large enough to reorder words before the end of the chunk, the resulting translation will not need to be reordered to properly reflect the spoken language. A chunk size prediction model is trained to predict chunk sizes using a chunk size labeled training data set that includes thousands to millions of chunk size labeled phrases for each language.

By fixing the outputs as each complete chunk is processed, the outputs may be displayed as a transcript in the target language without future revision. In further examples, the outputs may be stored locally or in cloud storage, or may be communicated to a user device for display or audible output via text to speech processing. Lack of further revision of the target language transcript makes it easier for readers to follow than transcripts that are revised using prior methods of speech translation. Such revisions done by prior methods can be distracting and confusing to users and take more effort to comprehend.

Fixing outputs as each complete chunk is processed saves computing resources in that processing is not required to revise the outputs of the previous chunks. Revising previous outputs from a chunk could result in a change in the prefix being used to process a current chunk, requiring reprocessing of frames in the current chunk. Since the previous chunk is not revised, no such reprocessing of frames in the current chunk is required.

FIG. 1 is a block flow diagram 100 for providing low latency translation of speech 110 in a source language to text in a target language that is different than the source language. In one example, source language speech in French is translated into target language in English text for use by people who may not understand French well, but do understand English. Low latency speech translation is very useful in international conferences or negotiations, or simply for tourists visiting countries where they are not fluent in the local language.

The speech 110 is divided into temporally consecutive chunks 115, 120, and 125. Each chunk is comprised of multiple temporally consecutive frames of acoustic data as indicated at 130 (F1), 132 (F2), 134 (F3), and 136 (FN). In one example, there may be three to 25 or more frames of acoustic data per chunk, with each frame including about 40 ms of acoustic data. As shown in FIG. 1, frame 130 F1 is the first 40 ms of acoustic data corresponding to the first 40 ms of speech 110. Frame 132 F2 is the next 40 ms, frame 134 F3 is the next 40 ms, and frame 136 FN is the last 40 ms of acoustic data corresponding to the Nth 40 ms of speech of chunk 115. Chunk 120 includes the next N frames of acoustic data starting with frame N+1. Chunk 124 includes N frame of acoustic data starting with frame 2N+1.

The size of the frames is usually fixed in length of time and may vary in further examples and may be selected to optimize a search algorithm used to search for target language tokens corresponding to the acoustic data within a frame.

Language tokens may be selected from a decoding vocabulary which may include 4000 or so language tokens in one example. Language tokens may be characters, words or portions of words, that is, sub-words, in one example.

In one example, the search for language tokens is performed using a frame-by-frame beam search. As each frame is searched, intermediate results may be generated prior to completing the beam search on the chunk. The intermediate results may be preserved as searching of the chunk continues, with each result having an associated conditional probability, and the best intermediate result having the highest conditional probability. In one example, each of the internal candidate tokens has an associated conditional probability generated via the beam search. The best candidate will the token or tokens having the highest conditional probability.

As additional frames are searched, the best candidate may change. At the end of processing all the frames in chunk 115, the best candidate token or tokens are identified by having the highest probability and are fixed as indicated at output 140. Output 140 includes a fixed output that serves as a prefix for processing the next chunk 120 of frames. Output 140 may include one or more characters or words that are not revised following completion of processing of frames 130, 132, 134, and 136 of chunk 115. The output 140 may be thought of as corresponding to a greedy search result of a first level or chunk 115.

Chunk 120 is processed in the same manner as chunk 115 using beam search on the frames, and may use output 140 as a prefix to help predict the language tokens contained in the frames in chunk 120, The predicted language tokens from chunk 120 are shown as output 145. As each chunk is processed, the outputs from each chunk may be communicated to a device or storage device or system from which the output can be printed or displayed to a user for reading without being further revised.

By fixing the outputs as each complete chunk is processed, the outputs may be displayed as a transcript in the target language without future revision. In further examples, the outputs may be stored locally or in cloud storage, or may be communicated to a user device for display or audibilization via text to speech processing. The user device may also access the output from the local or cloud storage for output to the user. Lack of further revision of the target language transcript makes it easier for readers to follow than transcripts that are revised as processing continues. Such revisions can be distracting and confusing and take more effort to comprehend.

Figure 2:
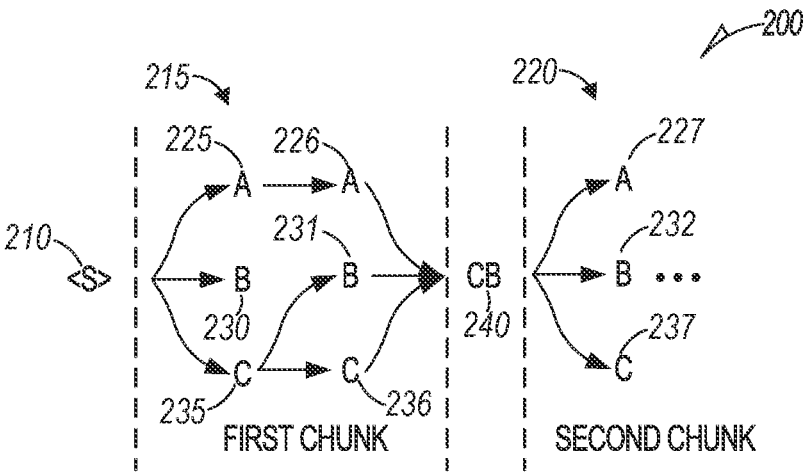
FIG. 2 is a flow diagram illustrating a method of using beam search within chunks to decode acoustic frames into target language tokens according to an example embodiment.

FIG. 2 is a flow diagram illustrating a method 200 of using beam search within chunks to decode acoustic frames into target language tokens. Speech 210 is divided into chunks 215 and 220. Further chunks are represented by dots and are not shown for simplicity of illustration. The chunks may include multiple frames of acoustic data that are to be decoded into target language tokens. The frames are not shown for ease of illustration. Candidate tokens are represented by letters, A 225, B 230, and C 235, which may represent words or portions of words. A beam search involves searching potential tokens to determine a best match with the acoustic information in the frames. One example beam search program is Beam search by OpenNMT. The best match in a beam search is usually the candidate language token or tokens having the highest probability generated by the beam search.

In one example, the beam search may select token A 225 in response to the first few frames being processed. Other candidates include token B 230 and token C 235. Further frames are searched, which may result in candidate tokens A 225 and A 226, C 235 and B 231, and C 235 and C 236 being candidates. At the end of the chunk 215, candidate CB 240 is selected as the set of tokens with the highest confidence. Candidate CB 240 is fixed and not revised while processing continues with chunk 220 by again performing beam search to match tokens A 227, B 232, and C 237 on successive frames in Chunk 220.

Figure 3A:
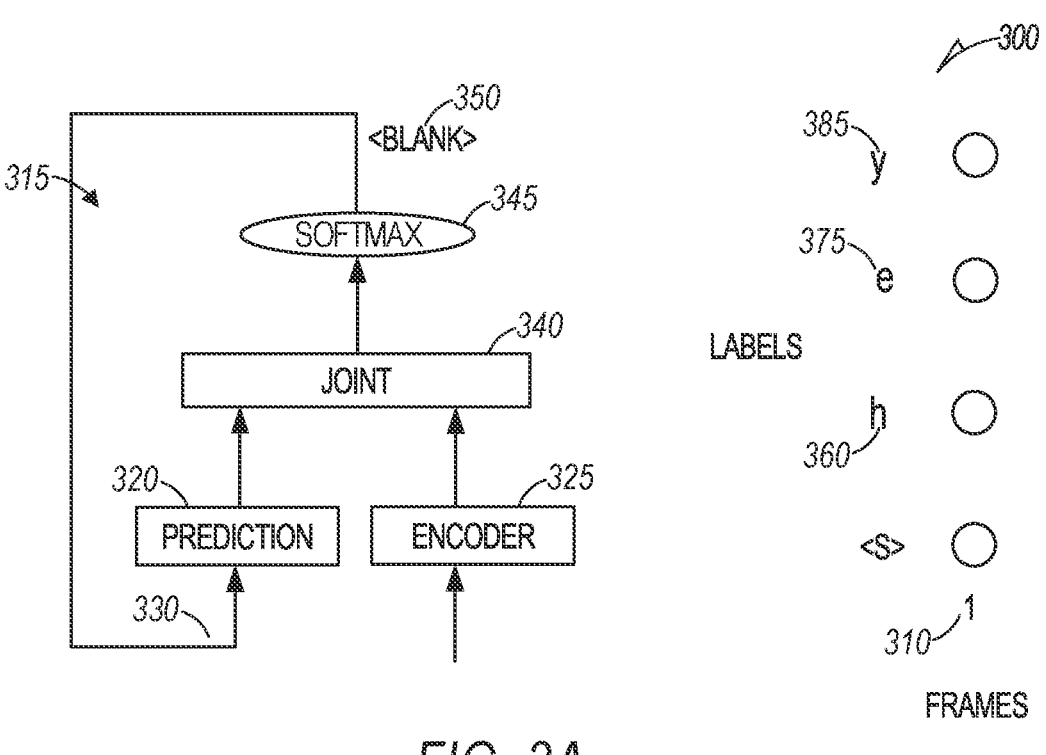
FIGS. 3A, 3B, 3C, 3D, 3E, 3F, 3G, 3H, and 3I show processing of acoustic frames in a chunk according to an example embodiment.

FIG. 3A is a block diagram illustrating a system 300 for performing beam search on frames, such as frame 1 310 in a chunk. FIGS. 3B, 3C, 3D, 3E, 3F 3G, 3H, and 3I show processing of additional frames in the chunk. The frames are processed by a neural transducer-based model 315. In one simple example, the frames to be processed in the chunk of six frames will result in the word "hey" being identified in the target language.

Model 315 includes a language prediction model 320 and an encoder 325. Language prediction model 320 receives text input 330. The text input may include previously predicted language tokens from processing previous frames. The encoder 325 correlates the acoustic data 335 to language tokens utilizing beam search Output from both the language prediction model 320 and the encoder 325 are combined by joint model 340 and softmax layer 345 to provide the prediction 350, currently indicated as blank. Prediction 350 is blank, as no tokens were identified as likely during processing of the first frame.

Figure 3B:
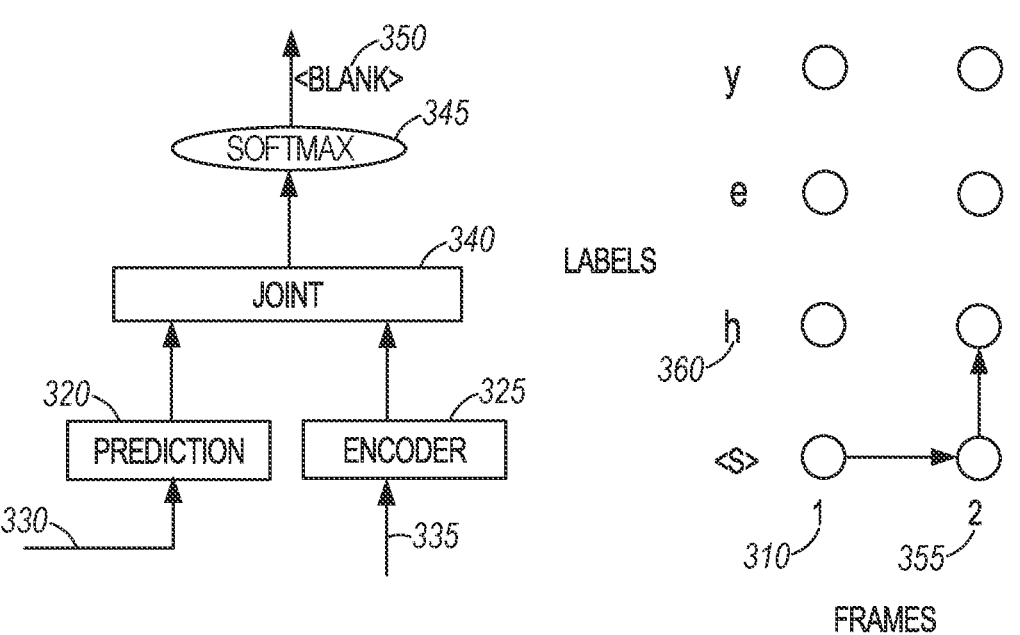

FIG. 3B illustrates transition to processing frame 2 355. Frame 2 355 is shown as being input at acoustic data 335 into encoder 325. The same previous text is input at text input 330 to prediction model 320.

Figure 3C:
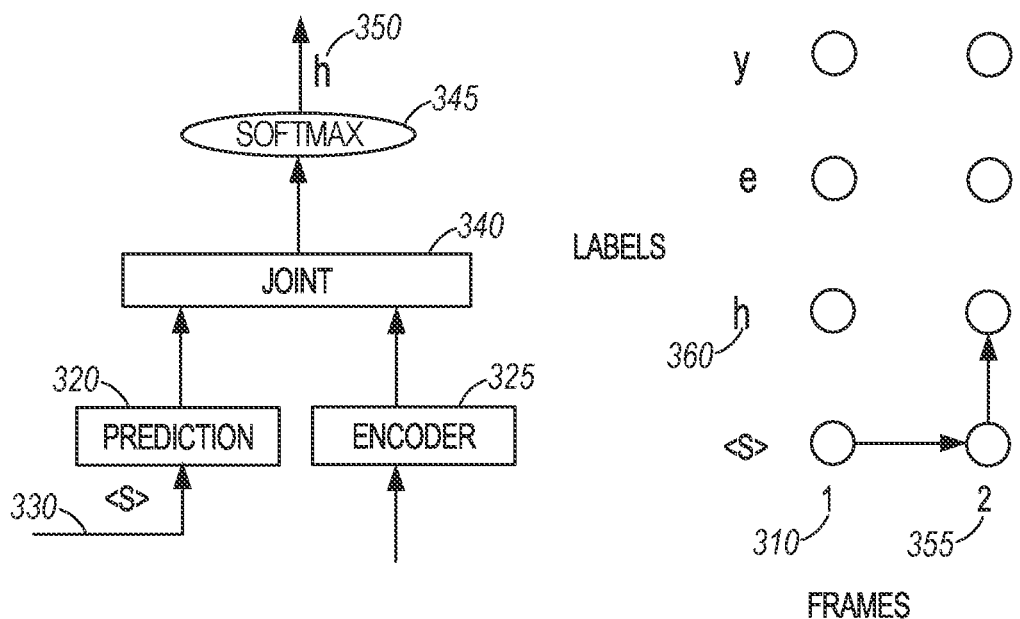

FIG. 3C illustrates that following processing of frame 2 355, a label of h 360 has been identified with sufficient confidence level as shown at prediction 350.

Figure 3D:
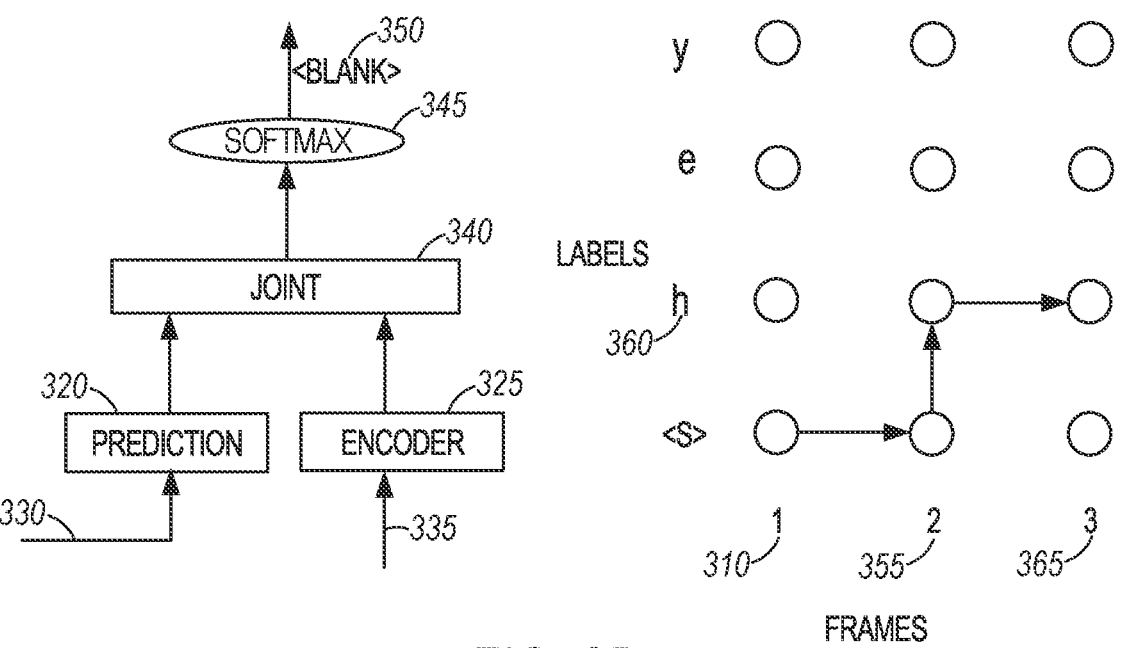

FIG. 3D illustrates transition to processing frame 3 365. Text input shows "h" being input to prediction model 320, and acoustic data 335 is frame 3 365.

Figure 3E:
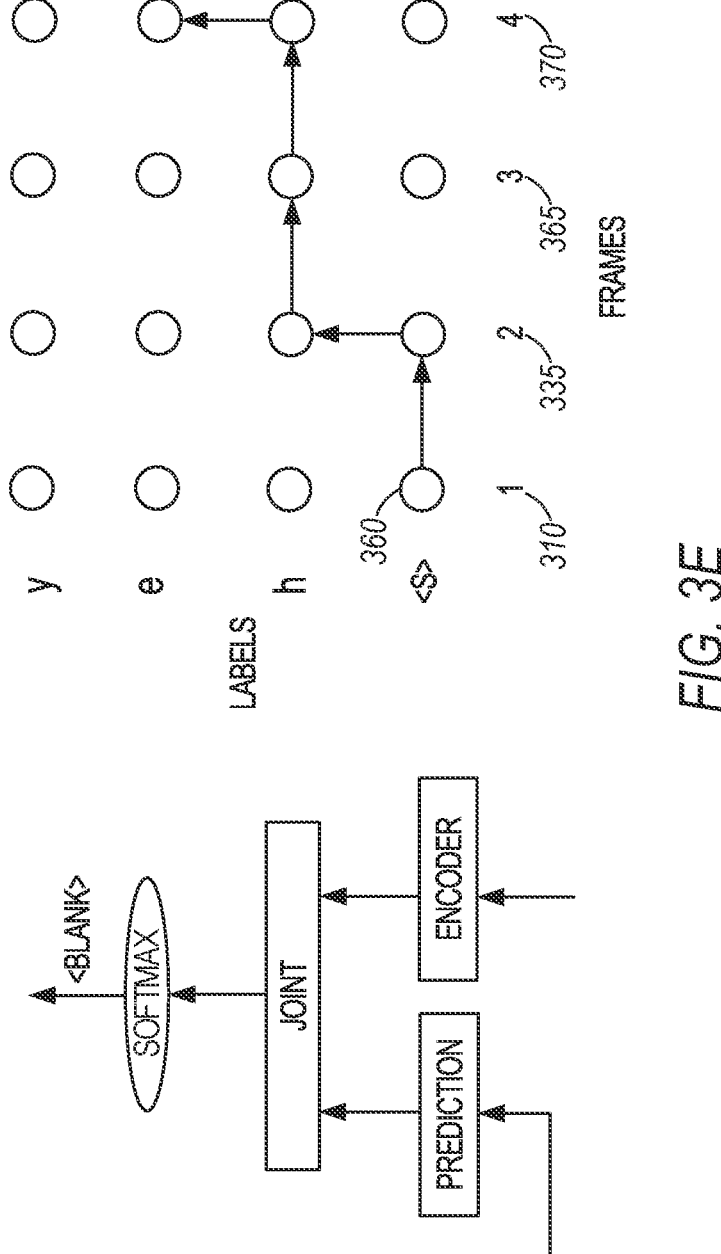

FIG. 3E illustrates that following processing of frame 3 365, no further language token has been identified for that frame, so frame 4 370 is the next frame to be processed.

Figure 3F:
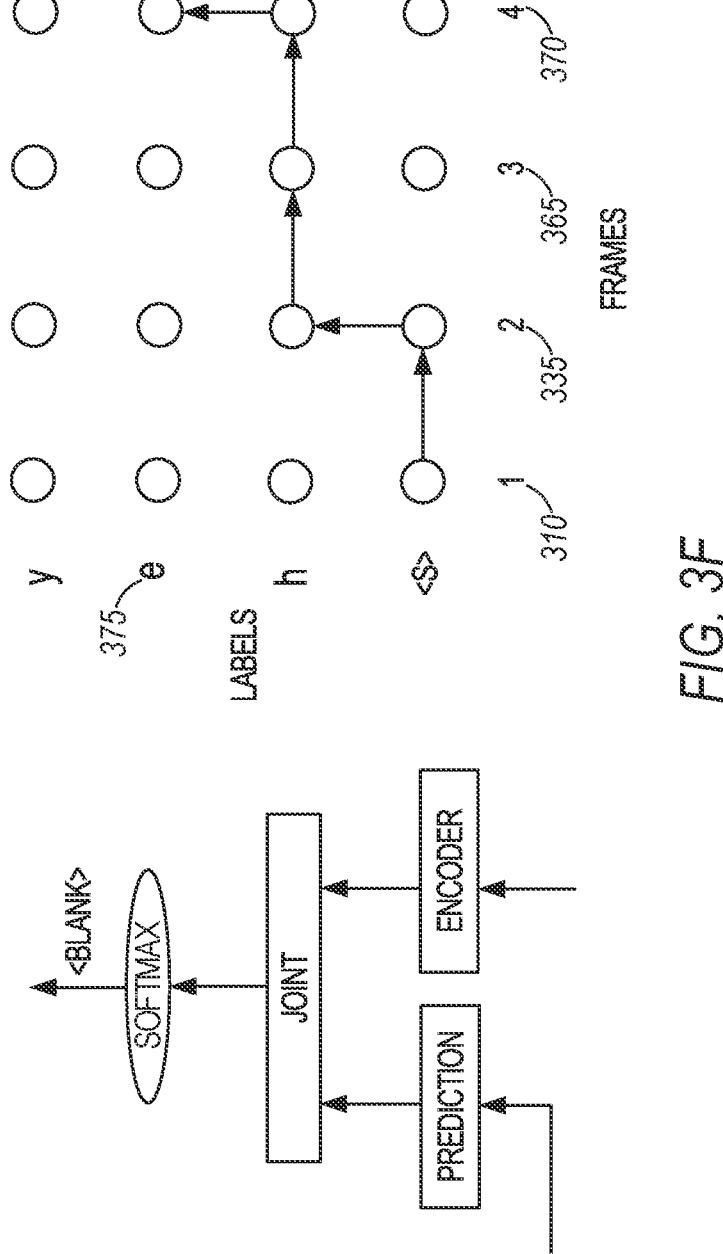

FIG. 3F illustrates that processing of frame 4 370, with h as the input to prediction model 320, results in identification of "e" at 375.

Figure 3G:
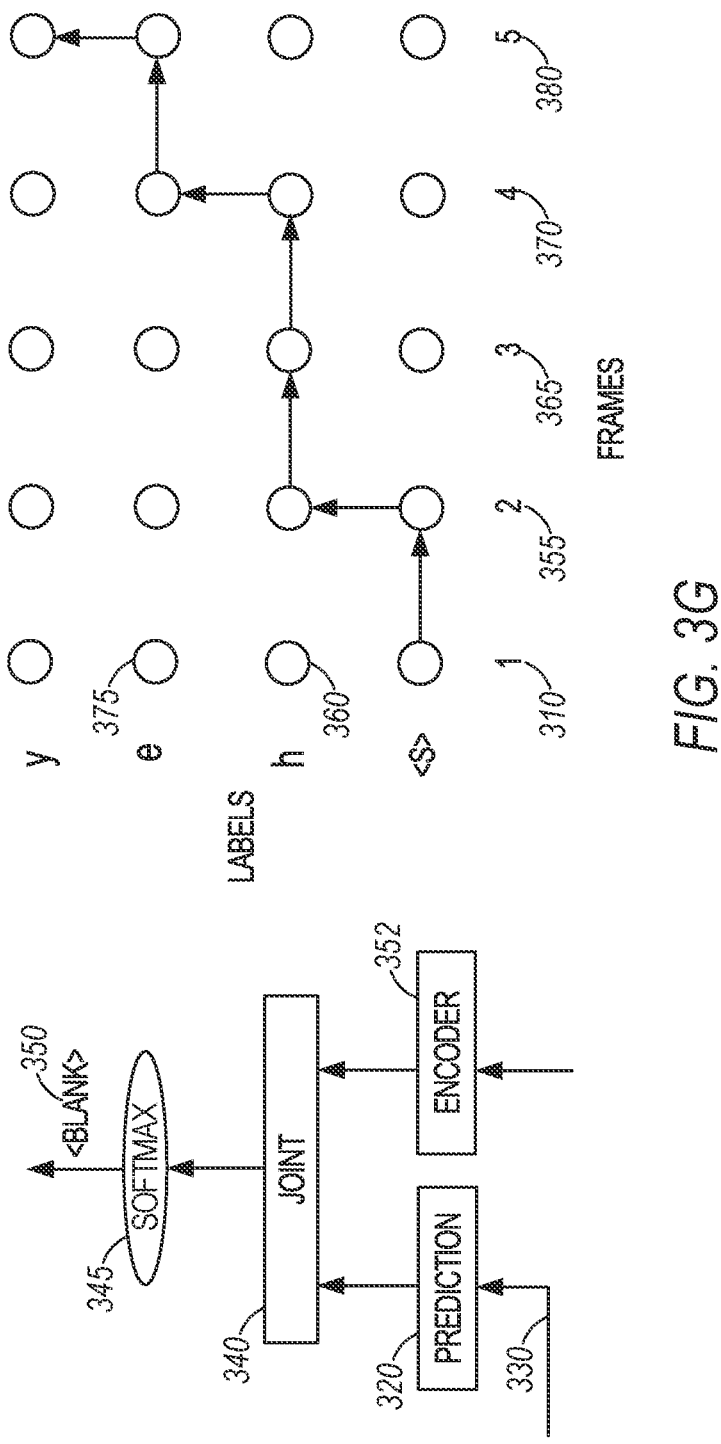

FIG. 3G illustrates that processing frame 4 370 does not result in identification of a further label, processing proceeds to frame 5 380.

Figure 3H:
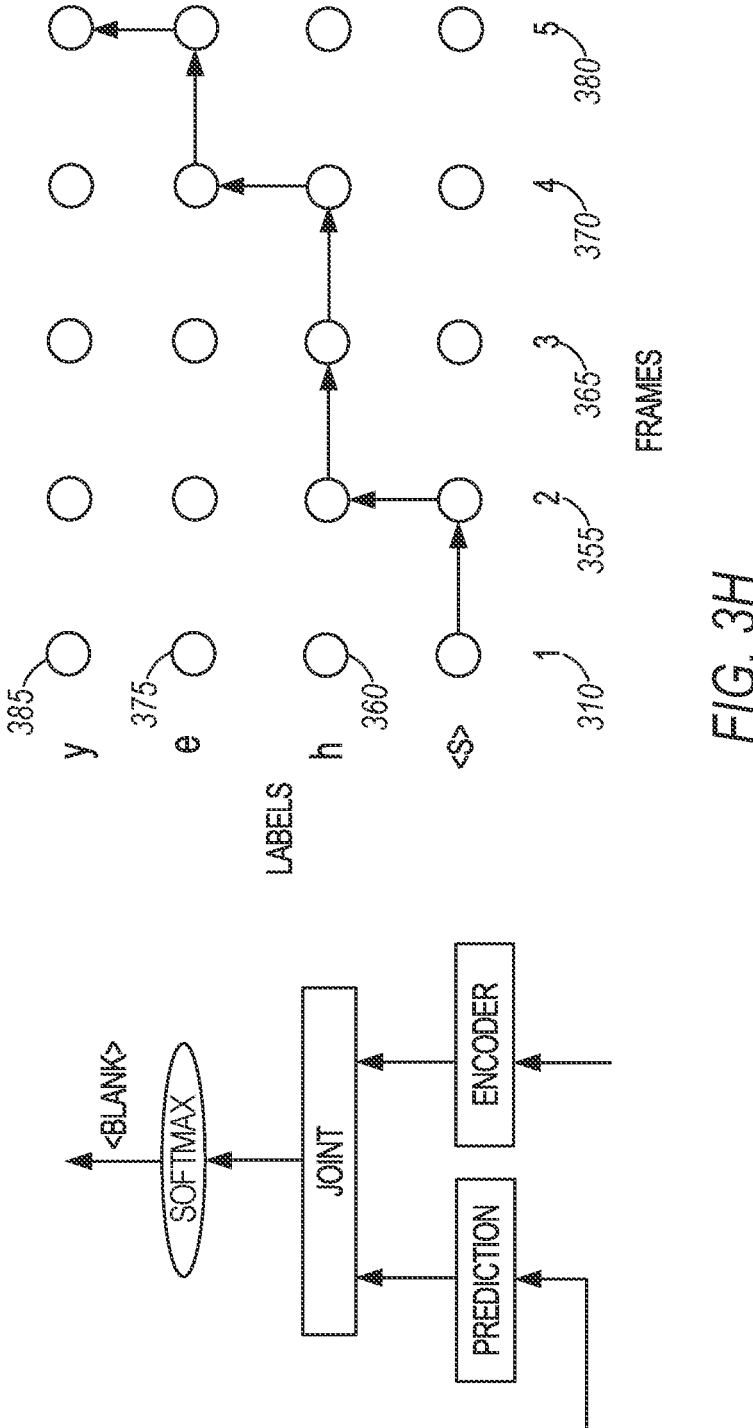

FIG. 3H illustrates that processing frame 5 380 results in identification "y" 385.

Figure 3I:
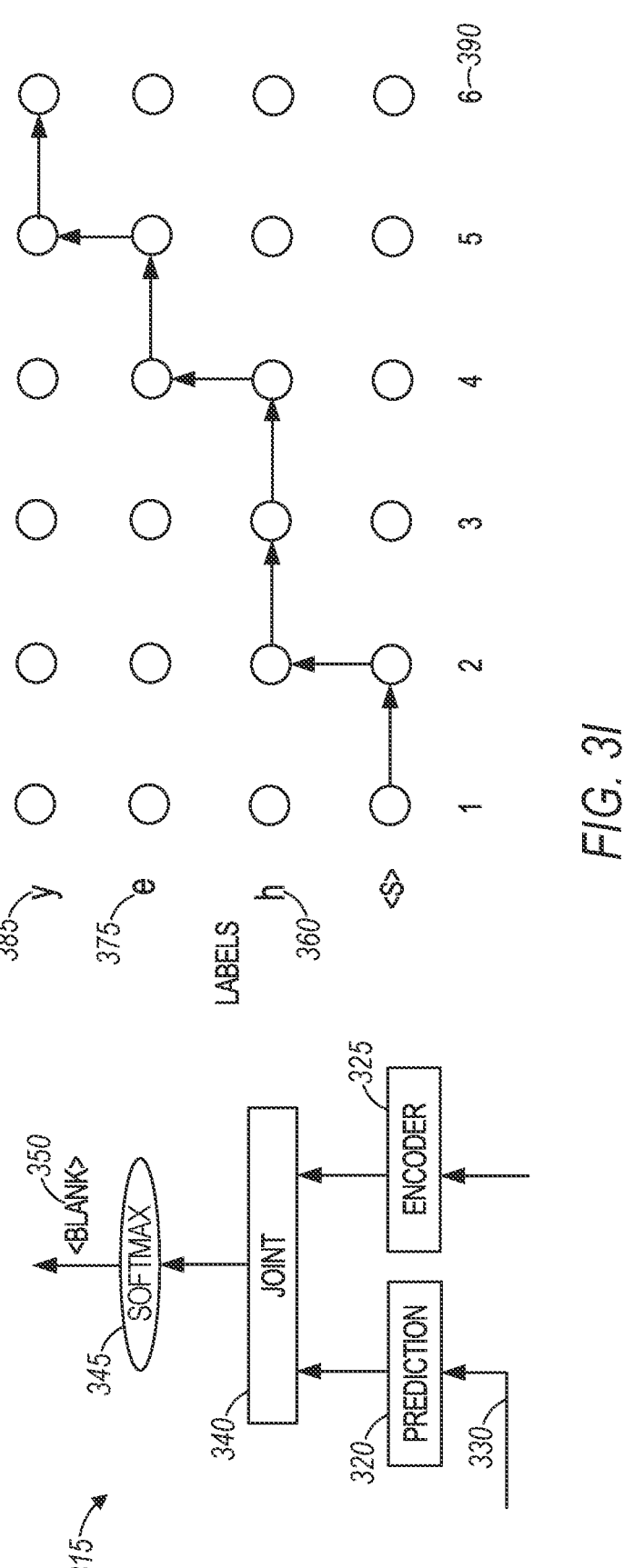

FIG. 3I illustrates that processing of the final frame 6 390 does not result in identification of a further label. The fixed output from processing the chunk comprises the six frames is "hey".

In some examples, the use of a fixed chunk size with the input audio length in each chunk being fixed, may result in an inability to reorder words in the translation of speech. Different languages may conventionally utilize different grammar, which can result in word order differences in proper translations. While one could go back and revise the order of words in the transcript following processing of multiple chunks, such reordering would make it more difficult for a listener and reader of the transcript to follow the translation.

Figure 4:
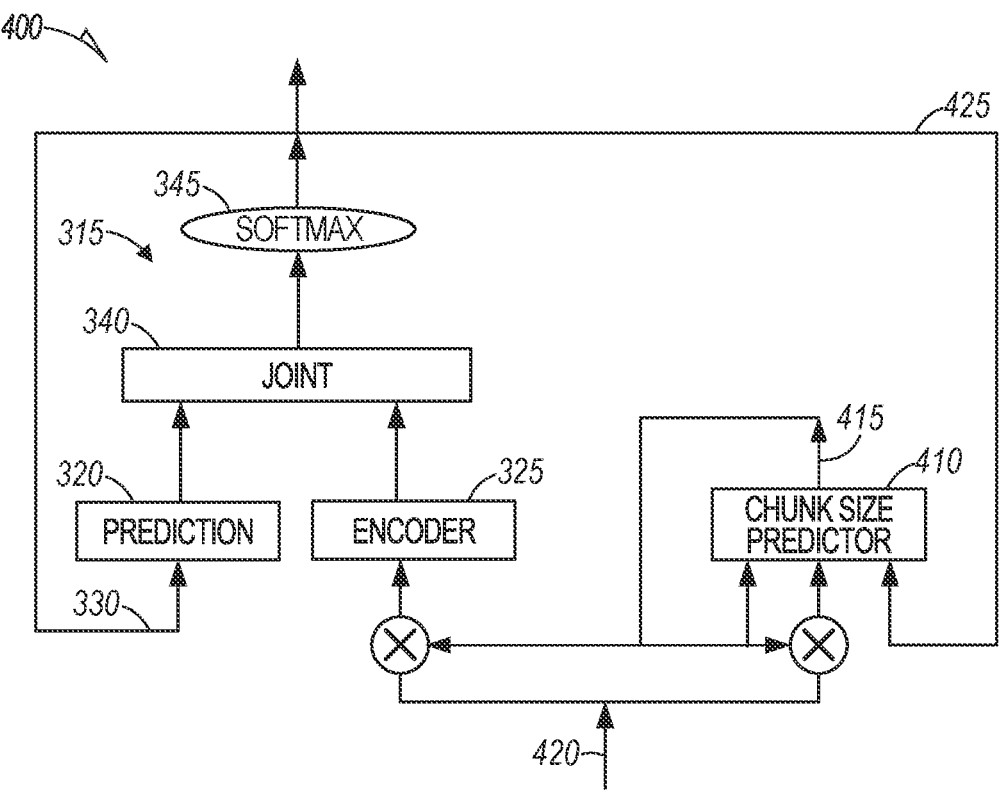
FIG. 4 is a block diagram of a real time speech to text translation system that dynamically modifies chunk sizes to include different numbers of acoustic frames according to an example embodiment.

FIG. 4 is a block diagram of a real time speech to text translation system 400 that dynamically modifies chunk sizes to include different numbers of acoustic frames. In one example, system 400 includes a chunk size predictor 410 that predicts a next chunk size 415, $C_t$ based on both previous chunk size and the frames in current chunk 420, $x_t$. Chunk size predictor 410 in one example is auto-regressive, which means that a history of chunks is also used to predict the next chunks size 415. The predicted next chunk size 415 is provided as input to encoder 325 of model 315. In one example, chunk size predictor 410 optionally uses the predicted text from model 315 that is used to predict text from the acoustic frames as indicated by line 425.

In one example, chunk size predictor 410 is a transformer model. Other neural network structures such as LSTM (long short-term memory) networks and conformer networks may alternatively be used and may include multiple layers of neural networks. The chunk size predictor 410 may be trained to know the target language but does not need to know the source language. During training, a target language ID may be used as an additional input to the chunk size predictor 410. For each target language, the model is trained using various source languages. During inference, the target language may be specified using the target language ID, whereas the source languages can be inherently derived by the model.

Thousands to millions of target language phrases in multiple languages may be used to train the chunk size predictor 410 and are selected based on a need for word reordering when translated from one or more source languages. Each phrase in the training data is associated with a chunk size to ensure that word reordering is not a problem.

The use of a fixed chunk size for an utterance in a source language to be translated into a target language may cause unnecessary latency when the chunk size is larger than needed. Translation performance may also be degraded when the chunk size is smaller than needed since the model 315 has not observed the required input information. The use of the dynamic chunk size predictor 410 to estimate a dynamic chunk size for the next output segment provides a fixed result per chunk that does not need word reordering.

Figure 5:
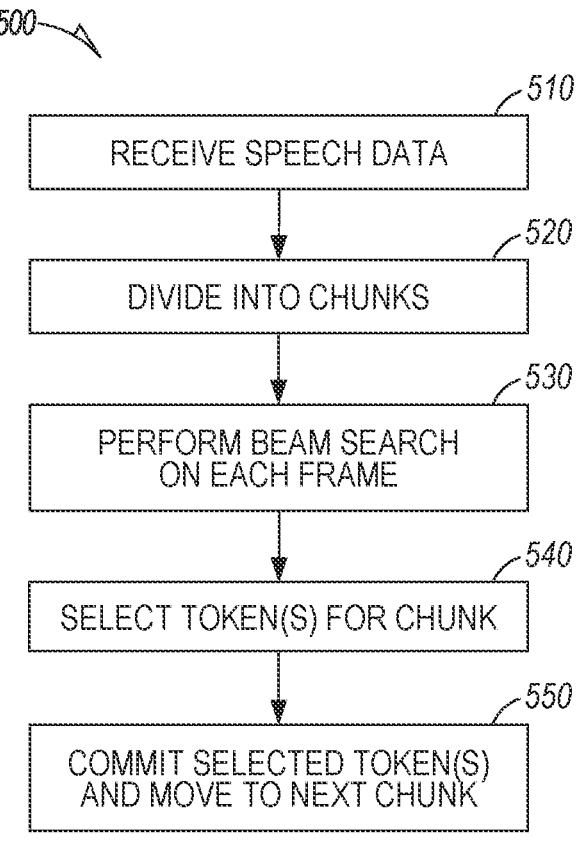
FIG. 5 is a flowchart illustrating a method of translating speech to text in real time according to an example embodiment.

FIG. 5 is a flowchart illustrating a method 500 of translating speech to text in real time. Method 500 begins at operation 510 by receiving speech data representative of speech in a first language. The speech data is divided into chunks of speech data at operation 520. Each chunk includes multiple temporally consecutive frames of acoustic information. Each frame in one example comprises 40 ms of acoustic data and each chunk comprises 10 or more frames of acoustic information.

Operation 530 processes each temporally consecutive chunk of data using beam search on each frame to identify candidate language tokens representing a second language different from the first language. The candidate language tokens may be characters or words. Candidate language tokens within a chunk are revisable as frames within the chunk are processed using beam search. In other words, as frames are processed, candidate language tokens are generated. Each candidate language token or tokens includes a conditional probability. As each additional frame is processed, the probabilities of the previous candidate language tokens may change based on new information in the additional frames, and new candidate language tokens may be added, each with their own probabilities.

At operation 540, a best candidate language token or tokens are selected for each chunk as processing of the chunk is completed. The best candidate language token or tokens are identified as the candidate language token or tokens having the highest probability at the completion of processing the chunk.

The selected best candidate language token or tokens for each chunk of data are committed at operation 550 as the only useable prefix for a next temporally consecutive chunk of frames. As shown in the example in FIGS. 3A-3I, the prefix for the next chunk is "hey". Processing then proceeds to the next chunk, using the fixed prefix of "hey" for use in performing the beam search on frames in the next chunk. Committing the best candidate language tokens prevents revision of a transcript being generated as each chunk is processed.

Figure 6:
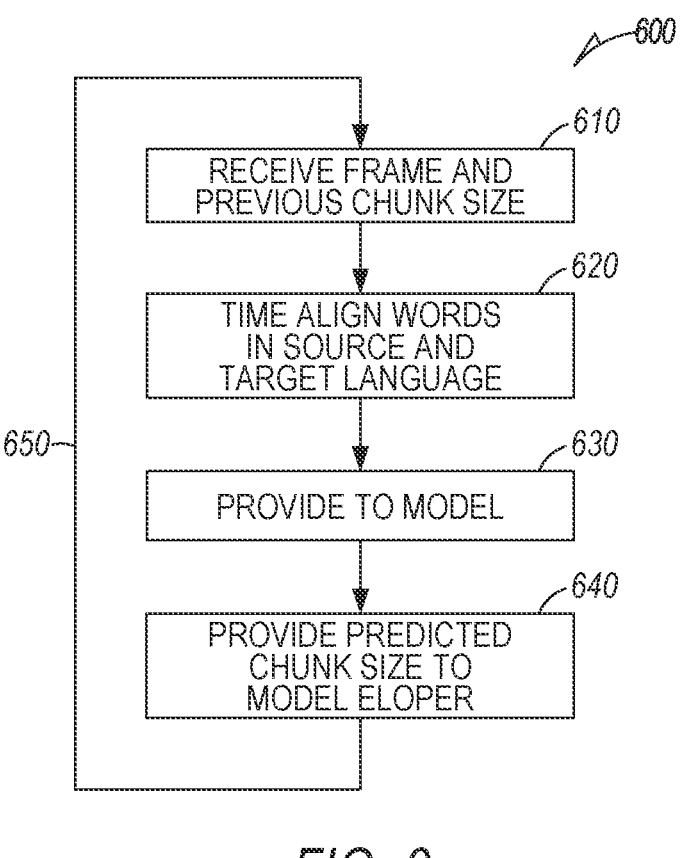
FIG. 6 is a flowchart of a computer implemented method of dynamically varying the number of frames in a chunk according to an example embodiment.

FIG. 6 is a flowchart of a computer implemented method 600 of dynamically varying the number of frames in a chunk. In one example, the number of frames in a chunk is dynamically variable using a chunks size prediction model based on the length of phrases that result in word reordering during translation to a target language. Dynamically varying the chunk size allows selection of a chunk size that is sufficiently large to prevent the need for reordering words in committed language tokens for a chunk.

Method 600 begins at operation 610 by receiving frames of acoustic data and a previous chunk size at the chunk size prediction model. The predicted text from the previous frame or frames may also be received as input. The chunk size prediction model in one example is trained on chunk size labeled phrases in multiple target languages to generate a predicted chunk size of a next chunk. The labeled phrases include word reordering from corresponding phrases in a source language. An example of word reordering may be based on grammatical differences between two languages such as English and French. One example includes blue ball being reordered to boule bleue in French.

At operation 620, words in source language are time aligned with corresponding words in the target language using alignment tools. The time alignment for each word is leveraged to formulate the dynamic chunk size prediction task as a supervised learning problem. In other words, aligning the source and target words enables the use of labeled phrases in the target language for training by ensuring the source and target words are synchronized.

In one example, the predicted chunk sizes (i.e. the outputs of the chunk size predictor) are applied to (the audio features of) source languages. Since the end-to-end speech translation model only has source language audios and target language texts as training data, it is difficult to associate the non-reordering target phrases with input source language audio features.

To obtain the time segments of the source language audio associated with non-reordering target phrases, source language text is used as a bridge. The alignment tools are used to align non-reordering target phrases and source text segments. The time information, or time alignment, between source audio and source text is used to segment the source audio features.

At operation 630, input is provided to the chunk size prediction model 410. The input includes the source audio, the estimated chunk size values from prior step, and optionally the prior output token. The model 410 generates the estimated chunk size for the next segment of target language tokens that do not have word reordering. During training, the module is trained using the time alignment of the source language audio segments as labels. At inference time, the module generates estimated chunk sizes regressively. Given the example about of blue ball in English, the chunk size is dynamically modified to be large enough to include two words, "blue" and "ball" or other phrases that are likely to be reordered during translation.

At operation 640, the chunk size prediction model provides a predicted chunk size to an encoder of model 315, which then processes a number of frames equal to the predicted chunk size prior to fixing the output for the chunk. While the current chunk is being processed, the predicted chunk size may be updated dynamically, which can change the number of frames per chunk while processing the chunk. If the predicted size drops below the number of frames already processed for the current chunk, processing of the chunk ends, and the currently predicted text for the chunk becomes fixed. At operation 650, processing repeats for the next frame of acoustic data.

Figure 7:
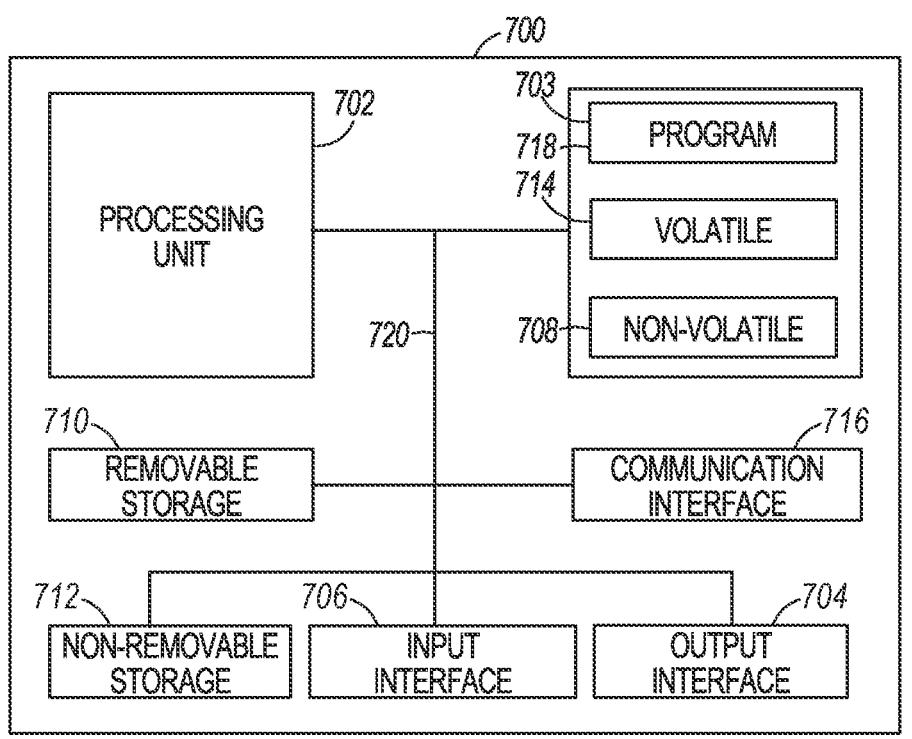
FIG. 7 is a block schematic diagram of a computer system to implement one or more example embodiments.

FIG. 7 is a block schematic diagram of a computer system 700 to implement one or more systems and models for speech translation and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow, network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A computer implemented method includes receiving speech data representative of speech in a first language. The speech data is divided into chunks of speech data, each chunk comprising multiple temporally consecutive frames of acoustic information. Each temporally consecutive chunk of data is processed using beam search on each frame to identify candidate language tokens representing a second language different from the first language. A best candidate language token(s) is selected for each chunk as processed. The selected best candidate language token or tokens for each chunk of data is committed as a prefix for a next temporally consecutive chunk of data.

2, The method of example 1 wherein candidate language tokens within a chunk are revisable as frames within the chunk are processed using beam search.

3. The method of any of examples 1-2 wherein each frame represents 40 ms of speech in the first language.

4. The method of any of examples 1-3 wherein each chunk includes 10 or more frames of acoustic information.

5, The method of any of examples 1-4 wherein the candidate language tokens include characters, sub-words or words.

6. The method of any of examples 1-5 wherein the number of frames of acoustic information in a chunk is dynamically variable.

7. The method of any of examples 1-5 and further including dynamically varying the number of frames of acoustic information in chunks using a chunk size prediction model trained on chunk size labeled phrases in multiple second languages to generate a predicted chunk size of a next chunk.

8. The method of example 7 wherein the labeled phrases include word reordering from corresponding phrases in the first language.

9. The method of any of examples 7-8 wherein the chunk size prediction model utilizes time alignment for words in the first and second languages.

10. The method of any of examples 7-9 and further including generating the next chunk with frames in accordance with the predicted chunk size.

11. The method of example 10 wherein the predicted chunk size is selected to enable word reordering within the chunk.

12, The method of claim 1 wherein selecting a best candidate language token or tokens for each chunk as processed comprises selecting the candidate language token or tokens having a highest beam search conditional probability at the end of processing each chunk.

13. A machine-readable storage device having instructions for execution by a processor of a machine to cause the processor to perform operations to perform any of the methods of examples 1-12.

14. A device includes a processor and a memory device coupled to the processor and having a program stored thereon for execution by the processor to perform operations to perform any of the methods of examples 1-12.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:

receiving speech data representative of speech in a first language;

dividing the speech data into temporally consecutive chunks of digital speech data, each chunk comprising multiple temporally consecutive frames of acoustic information;

processing each temporally consecutive chunk of data in a model that includes a language prediction model and encoder, wherein the encoder correlates the digital speech data to language tokens using beam search on each frame to identify candidate language tokens representing a second language different from the first language;

selecting a best candidate language token or tokens for each chunk as processed; and committing the selected best candidate language token or tokens for each chunk of data as a prefix for a next temporally consecutive chunk of data and as a translation of the speech data into the second language.

2. The method of claim 1 wherein candidate language tokens within a chunk are revisable as frames within the chunk are processed using beam search.

3. The method of claim 1 wherein each frame represents 40 ms of speech in the first language.

4. The method of claim 1 wherein each chunk comprises 10 or more frames of acoustic information.

5. The method of claim 1 wherein the candidate language tokens comprise characters, sub-words or words.

6. The method of claim 1 wherein the number of frames of acoustic information in a chunk is dynamically variable.

7. The method of claim 1 and further comprising dynamically varying the number of frames of acoustic information in chunks using a chunk size prediction model trained on chunk size labeled phrases in multiple second languages to generate a predicted chunk size of a next chunk.

8. The method of claim 7 wherein the labeled phrases include word reordering from corresponding phrases in the first language.

9. The method of claim 7 wherein the chunk size prediction model utilizes time alignment for words in the first and second languages.

10. The method of claim 7 and further comprising generating the next chunk with frames in accordance with the predicted chunk size.

11. The method of claim 10 wherein the predicted chunk size is selected to enable word reordering within the chunk.

12. The method of claim 1 wherein selecting a best candidate language token or tokens for each chunk as processed comprises selecting the candidate language token or tokens having a highest beam search conditional probability at the end of processing each chunk.

13. A machine-readable storage device having instructions for execution by a processor of a machine to cause the processor to perform operations to perform a method, the operations comprising, receiving speech data representative of speech in a first language;

dividing the speech data into temporally consecutive chunks of digital speech data, each chunk comprising multiple temporally consecutive frames of acoustic information;

processing each temporally consecutive chunk of data in a model that includes a language prediction model and encoder, wherein the encoder correlates the digital speech data to language tokens using beam search on each frame to identify candidate language tokens representing a second language different from the first language;

selecting a best candidate language token or tokens for each chunk as processed; and committing the selected best candidate language token or tokens for each chunk of data as a prefix for a next temporally consecutive chunk of data and as a translation of the speech data into the second language.

14. The device of claim 13 wherein candidate language tokens within a chunk are revisable as frames within the chunk are processed using beam search.

15. The device of claim 13 wherein the candidate language tokens comprise characters, sub-words or words.

16. The device of claim 12 wherein the number of frames of acoustic information in a chunk is dynamically variable using a chunk size prediction model trained on chunk size labeled phrases in multiple target languages to generate a predicted chunk size of a next chunk.

17. The device of claim 16 and further comprising generating the next chunk with frames in accordance with the predicted chunk size.

18. The device of claim 17 wherein the predicted chunk size is selected to enable word reordering within the chunk.

19. A device comprising:

a processor; and a memory device coupled to the processor and having a program stored thereon for execution by the processor to perform operations comprising;

receiving speech data representative of speech in a first language;

dividing the speech data into temporally consecutive chunks of digital speech data, each chunk comprising multiple temporally consecutive frames of acoustic information;

processing each temporally consecutive chunk of data in a model that includes a language prediction model and encoder, wherein the encoder correlates the digital speech data to language tokens using beam search on each frame to identify candidate language tokens representing a second language different from the first language;

selecting a best candidate language token or tokens for each chunk as processed; and committing the selected best candidate language token or tokens for each chunk of data as a prefix for a next temporally consecutive chunk of data and as a translation of the speech data into the second language.

20. The device of claim 19 wherein the number of frames of acoustic information in a chunk is dynamically variable using a chunk size prediction model trained on chunk size labeled phrases in multiple target languages to generate a predicted chunk size of a next chunk that enables word reordering within the chunk.

* * * * *